(12) United States Patent
Chang

(10) Patent No.: US 6,209,564 B1
(45) Date of Patent: Apr. 3, 2001

(54) DEVICE FOR ADJUSTING PRESSURE DIFFERENCE IN A VALVE FED WITH TWO FLUIDS OF DIFFERENT PRESSURES

(76) Inventor: Chen-Liang Chang, No. 24, Kuang-Ho Road, Hsiaokang Dist., Kaohsiung (TW)

( * ) Notice: Subject to any disclaimer, the term of this patent is extended or adjusted under 35 U.S.C. 154(b) by 0 days.

(21) Appl. No.: 09/433,227

(22) Filed: Nov. 4, 1999

(51) Int. Cl.7 .................................................. G05D 11/035
(52) U.S. Cl. ......................... 137/99; 417/405; 418/206.1
(58) Field of Search ............................... 137/99; 417/405; 418/206.1

(56) References Cited

U.S. PATENT DOCUMENTS 2,873,889 * 2/1959 Mori ................................... 137/99 X
2,903,008 * 9/1959 Abbadessa ............................. 137/99
4,015,828 * 4/1977 Miles .............................. 418/206.1 X
4,032,391 * 6/1977 Moked et al. ................. 418/206.1 X
5,012,837 * 5/1991 Zepp ........................................ 137/99
5,156,301 * 10/1992 Hassell et al. ..................... 137/99 X
5,588,088 * 12/1996 Flaman ............................... 137/99 X

* cited by examiner

Primary Examiner—Stephen M. Hepperle
(74) Attorney, Agent, or Firm—Bacon & Thomas, PLLC

(57) ABSTRACT

A pressure difference adjusting device is provided for a valve having a first inlet for a first fluid of a first pressure, a second inlet for a second fluid of a second pressure not equal to the first pressure, and an outlet. The pressure difference adjusting device includes two rotatable elements that are mounted in a meeting area of the incoming fluids. The elements mesh with each other to drive each other when the elements are subjected to impact from the incoming fluids.

5 Claims, 3 Drawing Sheets

DEVICE FOR ADJUSTING PRESSURE DIFFERENCE IN A VALVE FED WITH TWO FLUIDS OF DIFFERENT PRESSURES

BACKGROUND OF THE INVENTION

1. Field of the Invention

The present invention relates to a device for adjusting pressure difference in a valve fed with two fluids of different pressures to assure feeding of one of the fluids of lower pressure.

2. Description of the Related Art

A faucet generally includes a hot water inlet and a cool water inlet. Inlet pressure and flow of cool water and hot water vary in response to required output condition (e.g., temperature and output rate of mixed water). When incoming waters of different pressure meet with each other, feeding of water (generally the hot water) of lower pressure is stopped by the cool water of higher pressure and thus cannot be outputted. Thus, water of lower pressure must be outputted before output of water of higher pressure to assure feeding of the former, yet a waste in water is inevitable. In addition, output of water of lower pressure is impossible if the pressure difference is too large. Gas leakage occurs if the fire for heating water is ignited by water pressure, as ignition is impossible.

SUMMARY OF THE INVENTION

It is a primary object of the present invention to provide a device for adjusting pressure difference in a valve fed with two fluids of different pressures to assure feeding of one of the fluids of lower pressure and to precisely control mixing ratio between the two fluids before output.

A pressure difference adjusting device in accordance with the present invention is provided for a valve of the type having two inlets for two fluids of different pressures. The pressure difference adjusting device includes two rotatable elements that mesh with each other and that are mounted in a meeting area of the two fluids and thus driven by the fluids. Since the elements mesh with each other, rotation of the elements results in a siphon effect to the fluid of lower pressure such that the incoming fluids can be outputted at an optional mixing ratio.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENT

Figure 1:
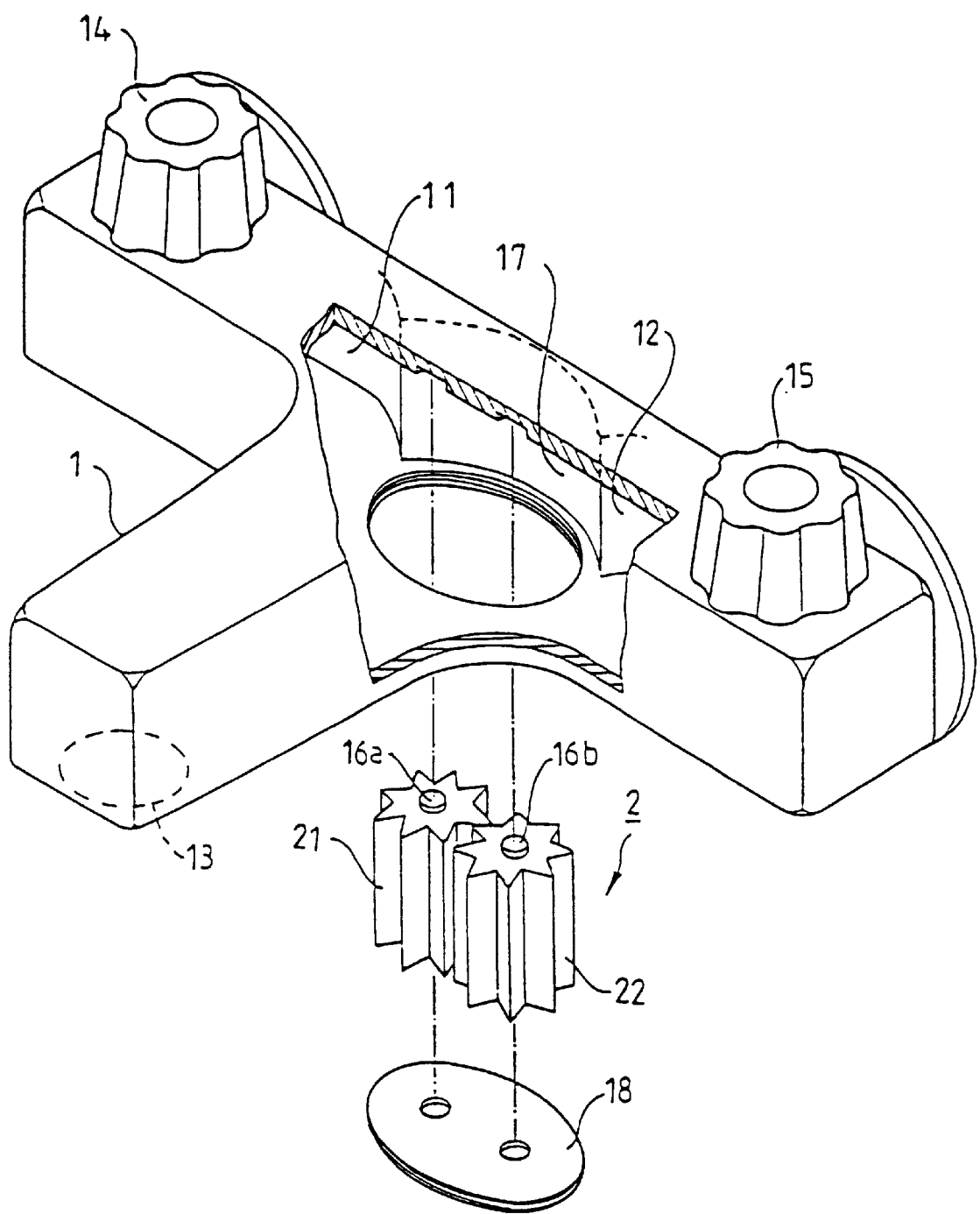
FIG. 1 is a perspective view, partly exploded, of a valve with a pressure difference adjusting device in accordance with the present invention.
Figure 2:
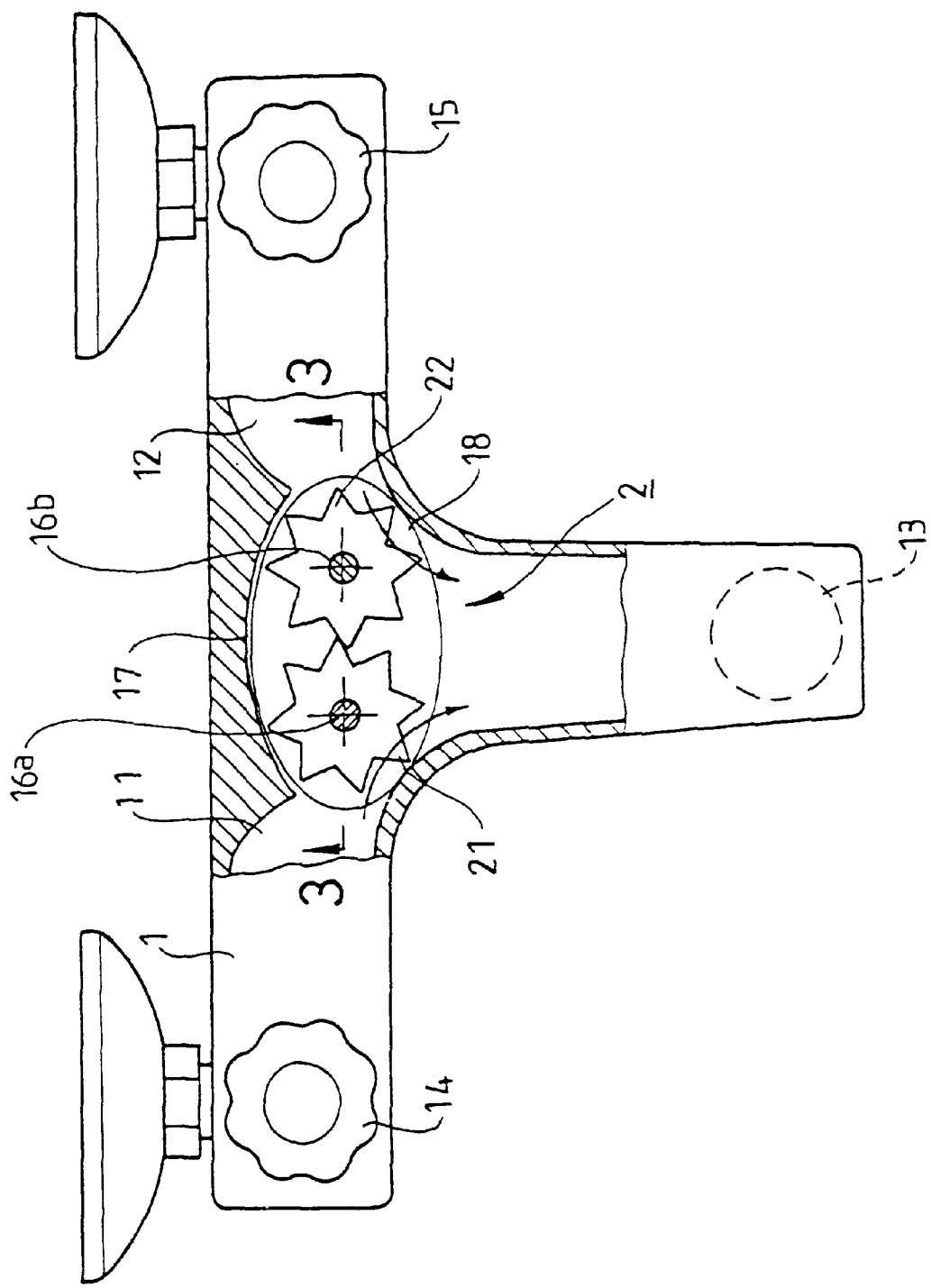
FIG. 2 is a front view, partly sectioned, of the valve.
Figure 3:
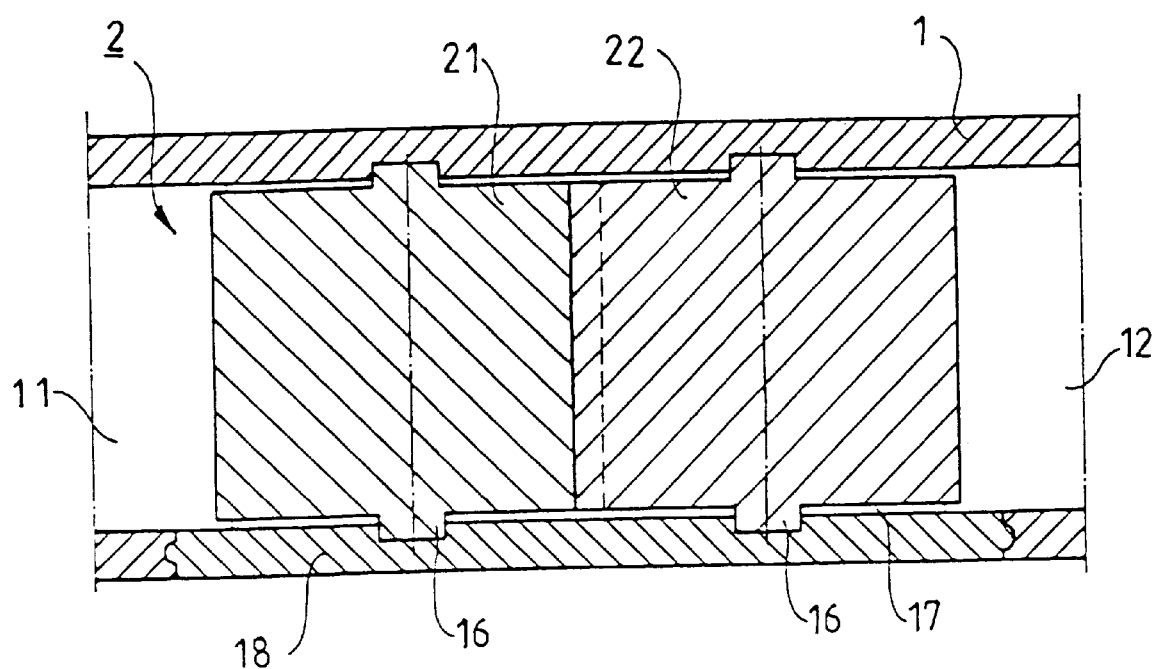
FIG. 3 is a sectional view taken along line 3—3 in FIG. 2.

FIGS. 1 and 2 illustrate a valve with a pressure difference adjusting device in accordance with the present invention and FIG. 3 is a sectional view taken along line 3—3 in FIG. 2. The pressure difference adjusting device is designated by "2" and is mounted in the valve with a valve body 1. The valve body 1 includes a first inlet 11 for a first fluid, a second inlet 12 for a second fluid, and an outlet 13. Thus, two fluids of different pressures can be inputted into the valve body 1 via the inlets 11 and 12 and then outputted via the outlet 13 after mixing. Each inlet 11, 12 includes a control valve 14, 15 for controlling flow of the fluids.

The pressure adjusting device 2 includes a first element 21 and a second element 22 that mesh with each other. The elements 21 and 22 may be gears or vane wheels to drive each other if one of them is driven by the incoming fluids from the inlets 11 and 12. Thus, the fluid of lower pressure is conducted out of the valve body via the outlet 13 by a siphon effect incurred as a result of rotation of the elements 21 and 22. In this embodiment, each element 21, 22 includes an axle 16a, 16b rotatably mounted to a plate 18 that is removably attached to an underside of the valve body 1. Thus, the elements 21 and 22 may rotate about fixed axes.

In order to provide better driving force for the elements 21 and 22, an inner peripheral wall of the valve body 1 may include a guide section 17 that partially surrounds the pressure difference adjusting device 2. Each end of the guide section 17 is arcuate for guiding incoming fluids of different pressures into the pressure difference adjusting device 2 to thereby provide most effective impact to the elements 21 and 22 and thus drive the elements 21 and 22.

According to the above description, it is appreciated that the pressure difference adjusting device may be used in valves of the type fed with two fluids of different pressures to provide pressure reduction during flow of fluids of different pressures.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A pressure difference adjusting device for a valve of the type having a first inlet for a first fluid of a first pressure, a second inlet for a second fluid of a second pressure not equal to the first pressure, and an outlet, the pressure difference adjusting device being mounted in the valve at a meeting area of incoming first fluid and incoming second fluid and comprising a first element rotatably mounted in the valve and drivable by the incoming first fluid and a second element rotatably mounted in the valve and drivable by the incoming second fluid, the first element and the second element meshing with each other for driving each other upon impact of the incoming first fluid and the incoming second fluid to any one of the first element and the second element.

2. The pressure different adjusting device as claimed in claim 1, wherein the valve body includes an inner peripheral wall with a guide section, the guide section including two ends that are arcuate for guiding the incoming first fluid and the incoming second fluid into the pressure difference adjusting device.

3. The pressure different adjusting device as claimed in claim 1, wherein the first element and the second element are gears.

4. The pressure different adjusting device as claimed in claim 1, wherein the first element and the second element are vane wheels.

5. The pressure different adjusting device as claimed in claim 1, wherein the valve body further includes a first control valve for controlling flow of the incoming first fluid and a second control valve for controlling flow of the incoming second fluid.

* * * * *